United States Patent
Mazur et al.

(10) Patent No.: US 8,365,876 B2
(45) Date of Patent: Feb. 5, 2013

(54) AIR BLADDER ACTUATOR FOR RAILROAD CAR RETARDER

(75) Inventors: Kevin M. Mazur, Milwaukee, WI (US); Robert B. Zimmer, Franklin, WI (US); Thomas J. Heyden, Arlington Heights, IL (US)

(73) Assignee: AAA Sales & Engineering, Inc., Oak Creek, WI (US)

( * ) Notice: Subject to any disclaimer, the term of this patent is extended or adjusted under 35 U.S.C. 154(b) by 403 days.

(21) Appl. No.: 12/756,453

(22) Filed: Apr. 8, 2010

(65) Prior Publication Data

US 2010/0258389 A1 Oct. 14, 2010

Related U.S. Application Data (60) Provisional application No. 61/167,625, filed on Apr. 8, 2009.

(51) Int. Cl.
*B61K 7/02* (2006.01)

(52) U.S. Cl. .............. 188/62; 188/43; 188/298

(58) Field of Classification Search ............ 188/43, 188/62, 153 D, 153 R, 170, 298; 267/118, 267/119, 130; 29/402.01, 402.08; 92/63, 93, 130 A See application file for complete search history.

(56) References Cited

U.S. PATENT DOCUMENTS

| | | | | |
|---|---|---|---|---|
| 3,196,985 | A | * | 7/1965 | Rowe et al. ............. 188/62 |
| 6,220,400 | B1 | | 4/2001 | Kickbush |
| 7,306,077 | B2 | | 12/2007 | Heyden et al. |
| 7,392,887 | B2 | | 7/2008 | Heyden et al. |
| 7,530,432 | B2 | | 5/2009 | Heyden |

OTHER PUBLICATIONS

AAASE Model 67; Hump Retarders; http://www.aaase-rr.com/products_hump-retarders_67.htm; Apr. 2, 2009.

AAASE Model 66 Standard Profile Retarder; Hump Retarders; http://www.aaase-rr.com/products_hump-retarders_66.htm; Apr. 2, 2009.

Photo of railroad retarder; http://www.aaase-rr.com/images/products/M32-or-M66-2.jpg; Apr. 2, 2009.

* cited by examiner

*Primary Examiner* — Christopher Schwartz
(74) *Attorney, Agent, or Firm* — Andrus, Sceales, Starke & Sawall, LLP (57) ABSTRACT

An air bladder actuator for a railroad car retarder utilizes a simplified stroke limiting arrangement that can be used in new actuator construction or applied as a retrofit assembly to an existing air cylinder actuated retarder.

16 Claims, 7 Drawing Sheets

AIR BLADDER ACTUATOR FOR RAILROAD CAR RETARDER

CROSS REFERENCE TO RELATED APPLICATION

This application relates to and claims priority from U.S. Provisional Application Ser. No. 61/167,625, filed on Apr. 8, 2009.

BACKGROUND OF THE INVENTION

The present invention pertains to an air bladder actuated railroad car retarder and, more particularly, to a simplified and low cost internal stroke limiting arrangement for an air bladder cylinder used in the retarder.

Air bladder actuators are well known in the railroad industry and are now commonly used to operate retarders in railroad marshalling yards. One commonly used air bladder is a Firestone AIRSTROKE actuator. The actuator includes a flexible bladder that is secured around the perimeter on opposite ends to a pair of end plates to form an air tight interior. The bladder is inflated and deflated to control its length and stops are used to set the maximum and minimum stroke lengths of the actuator. The stroke limiting arrangement is preferably provided on the interior of the bladder between the end plates.

SUMMARY OF THE INVENTION

In accordance with the present invention, a stroke limiting arrangement is provided on the interior of the bladder that is rugged, yet of low cost. The bladder actuator is capable of use in retrofit applications to replace air cylinders in existing retarders. The retrofit arrangement reuses components of the air cylinder.

DETAILED DESCRIPTION OF THE INVENTION

Figure 1:
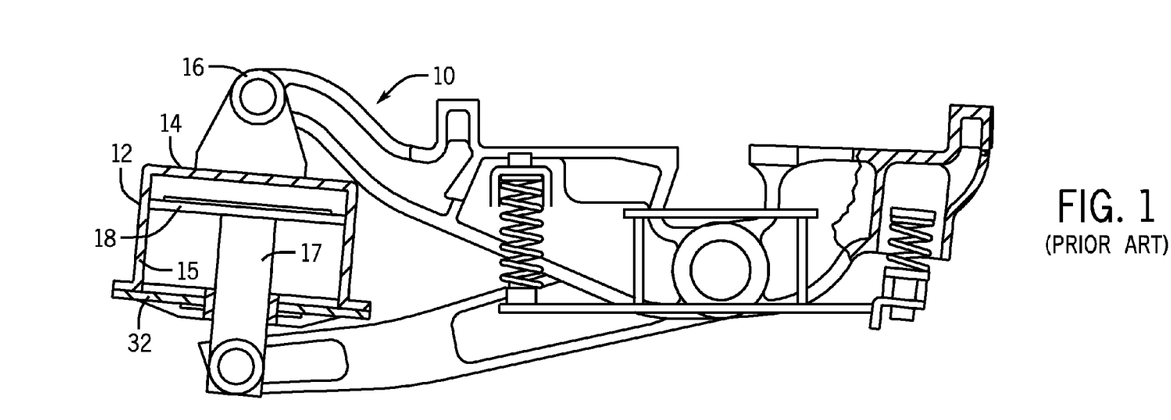
FIG. 1 is a side elevation view in partial section, of a prior art air cylinder actuated retarder which can be retrofitted with a conventional air bladder actuator utilizing the internal stroke control apparatus of the present invention.
Figure 2:
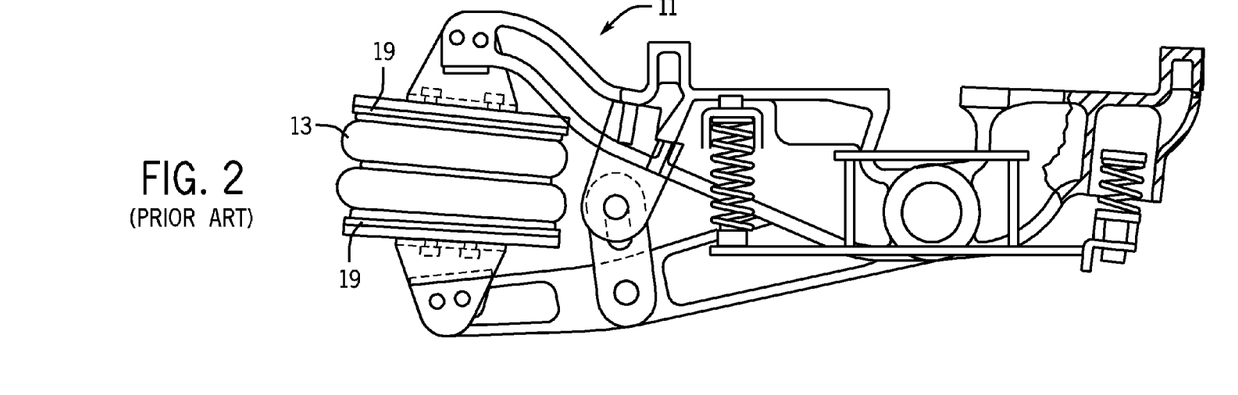
FIG. 2 is a side elevation view of a prior art air bladder actuated retarder utilizing a conventional double convolution air bladder actuator of the type identified above.
Figure 3:
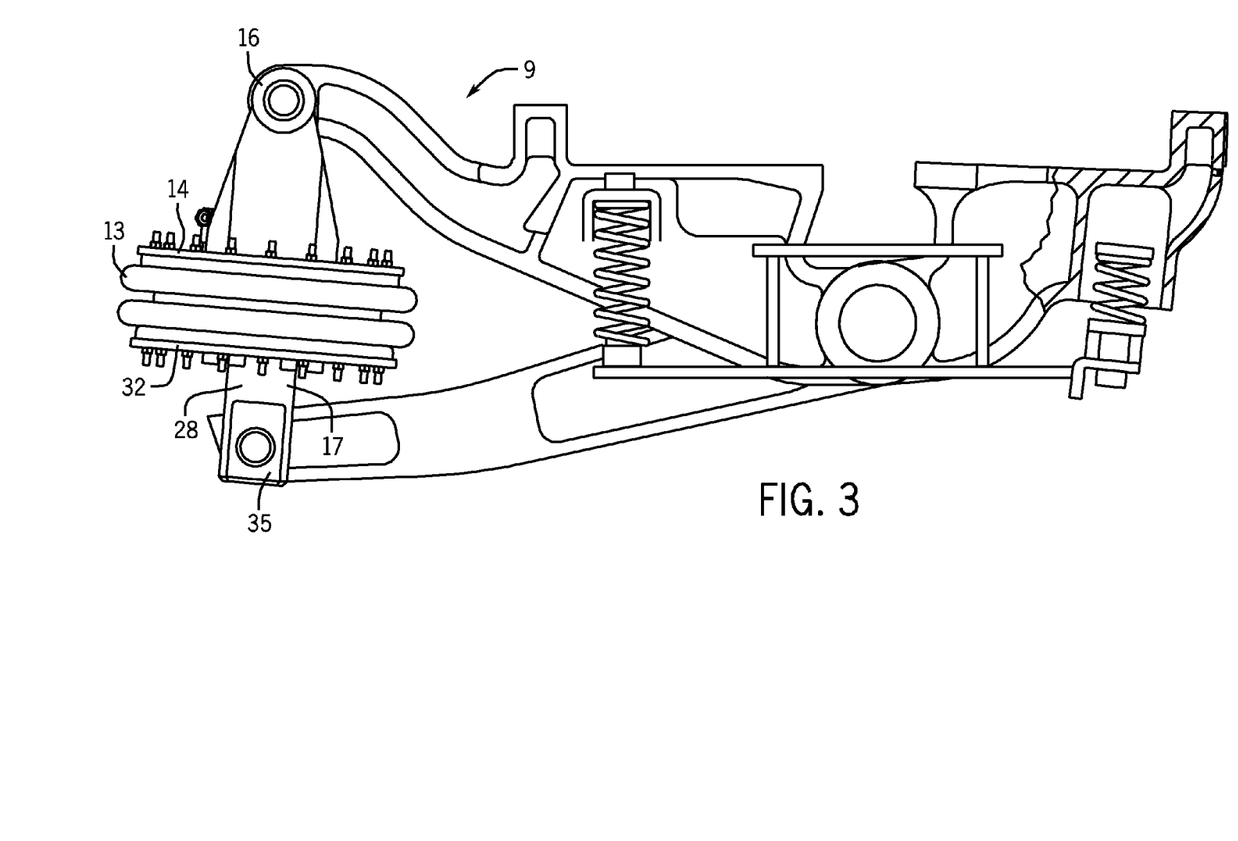
FIG. 3 is a side elevation view of a retrofit air bladder cylinder in accordance with the present invention.

In retrofitting an air cylinder actuated retarder 10 of the prior art type shown in FIG. 1, the air cylinder 12 is removed, but several components are retained, machined as may be necessary, and incorporated into an internal stroke limiting mechanism for an air bladder 13 (FIG. 3) that replaces the air cylinder 12. The air cylinder upper end plate 14 is cut from the cylinder body 15. The upper end plate 14 includes an integral pivotal clevis mount 16 which is also retained for use in the retrofit apparatus. The piston rod 17 of the air cylinder is also retained for reuse, but the piston head 18 is removed and not reused.

Figure 4:
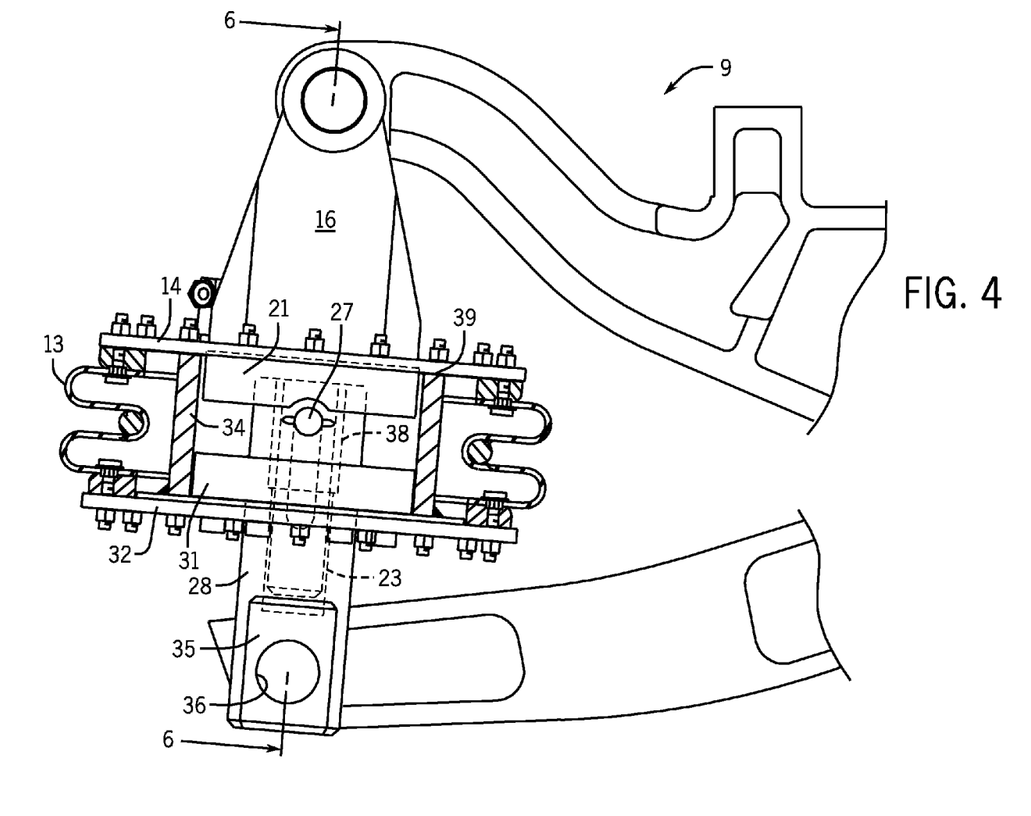
FIG. 4 is an enlarged detail, partly in section, showing a retrofit air bladder retarder in accordance with the present invention.
Figure 5:
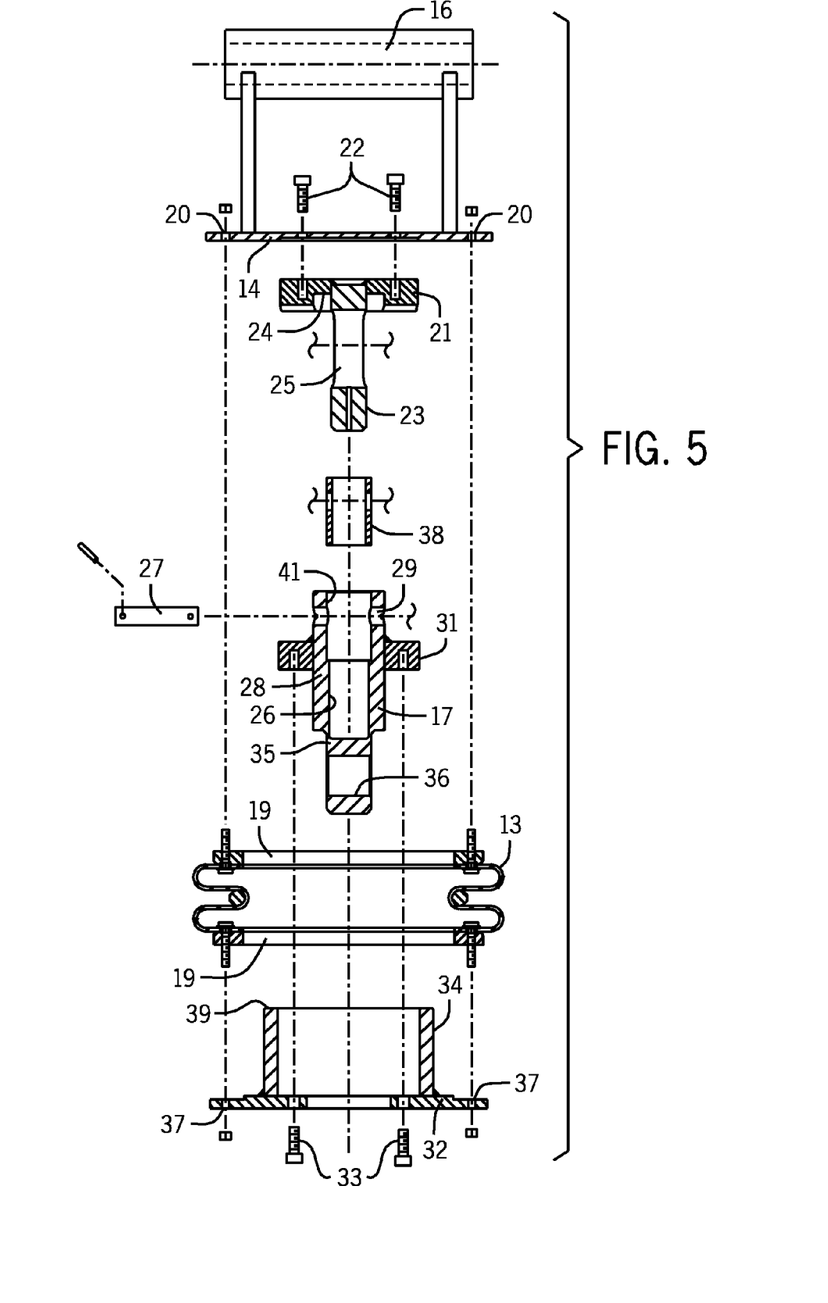
FIG. 5 is an exploded view of a retrofit stroke limiter assembly for use in the retarder shown in FIG. 1.
Figure 6:
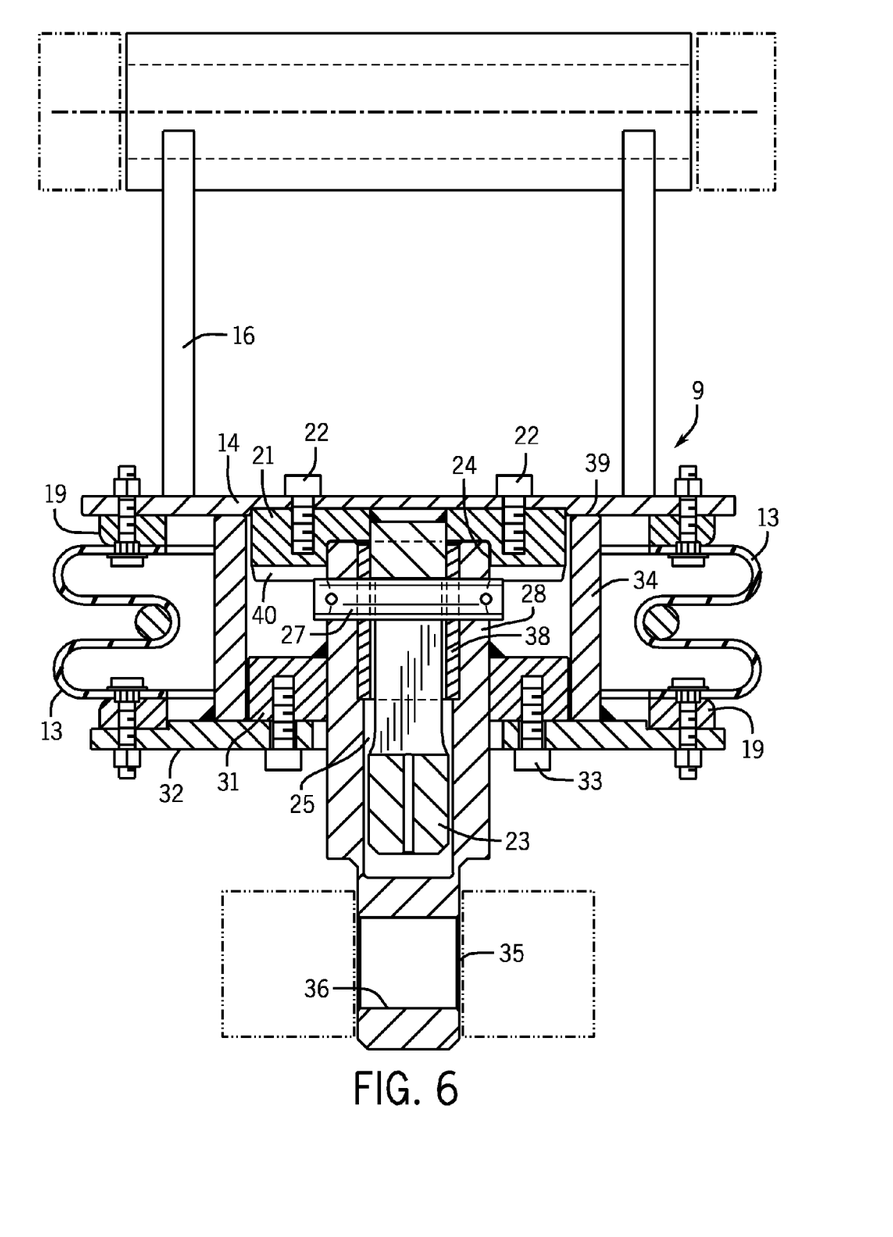
FIG. 6 is a sectional view of a retrofit air bladder actuator of the present invention taken on line 6-6 of FIG. 4 showing the retracted position of the actuator.
Figure 7:
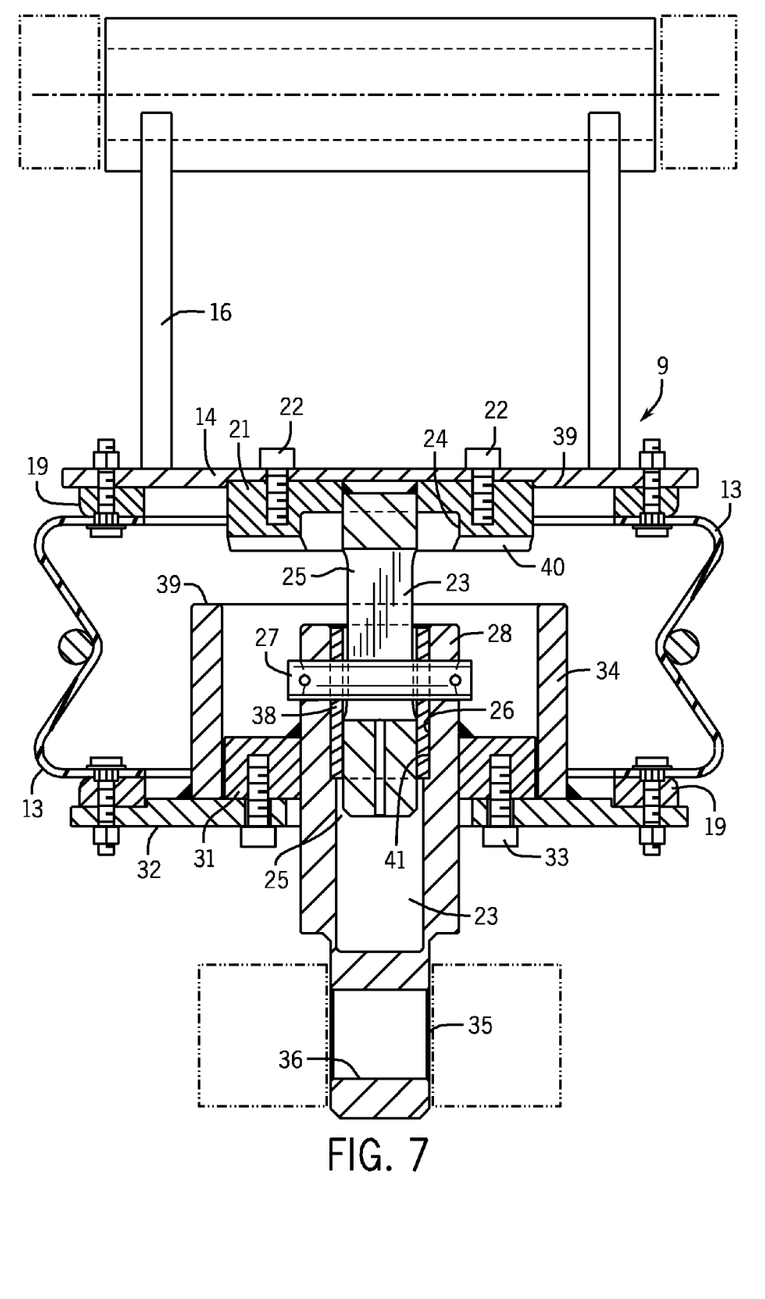
FIG. 7 is an enlarged sectional view taken on line 6-6 of FIG. 4 showing the retrofit air bladder actuator in its extended position.

Referring also to FIGS. 4 and 5, the peripheral edge of the upper end plate 14 is provided with a circular bolt hole pattern 20 through which bolts extend from the peripheral edge of the air bladder 13. The interface between the peripheral edge of the upper end plate and the air bladder 13 is provided with a suitable seal or sealing material to provide an air-tight interface. An upper mounting ring 21 is bolted to the lower inside face of the upper end plate 14 with bolts 22 inserted through the upper face of the upper end plate 14 into tapped holes in the upper mounting ring. The upper mounting ring 21 has a center opening 24 from which an attached guide rod 23 extends. As best seen in FIGS. 6 and 7 the guide rod is welded at its upper end to the upper mounting ring 21. The guide rod 23 is provided with an axially elongated through slot 25 to provide a guide and stop function as will be described below. Slot 25 also vents air to and from the blind bore 26 in the guide sleeve 28 described below.

Turning now to the lower end of the stroke control apparatus and referring also to FIGS. 4-6, the piston rod 17 (no longer acting as such) is provided at its upper end with an axial blind bore 26 for receipt of the guide rod 23. The piston rod 17 thus becomes a guide sleeve 28 for axial movement of the guide rod 23. The upper end of the guide sleeve 28 is provided with diametrically opposed holes 29 for receipt of a cross pin 27 which guides and, in part, limits the axial movement of the guide rod 23 within the bore 26 of the guide sleeve 28

A lower mounting ring 31 is secured to the guide sleeve 28 formed in the piston rod. The lower end plate 32 (from the air cylinder 12) is bolted to the lower mounting ring 31 with a circular pattern of bolts 33 extending upwardly through the end plate 32 and into tapped holes in the lower mounting ring 31. A large diameter cylindrical stop sleeve 34 is welded or otherwise secured to the upper surface of the lower end plate 32 on the center axis of the apparatus.

The lower end of the guide sleeve 28 retains the lower end of the air cylinder piston rod 17 which is provided with a pair of parallel opposite flats 35 through which is provided an axially perpendicular bore 36 for pivotal connection to a suitable clevis or other pivotal mounting arrangement (not shown).

The outer peripheral edge of the lower end plate 32 is provided with a circular bolt hole pattern 37 for bolted connection to the lower end of the air bladder 13 in a manner similar to the upper end described above. The interface, of course, must also provide an air-tight seal. In the arrangement of components described above, the upper end of the stroke control arrangement includes the slotted guide rod 23 positioned axially in and attached to the upper mounting ring 21 and thus secured to the upper end plate 14. The lower end of the guide and stroke limiting arrangement comprises the guide sleeve 28 secured to the lower end plate 32 and lower mounting ring 31 and a large diameter cylindrical stop sleeve 34. The upper and lower portions of the guide arrangement are connected by the cross pin 27 which can move within the elongated slot 25 as the air bladder 13 is pressurized and depressurized to, respectively, extend and retract the air bladder actuator 11. More specifically, maximum extension of the actuator by pressurizing the air bladder 13 is controlled by the cross pin engaging the bottom (lower end) of the guide rod slot 25. Retraction of the air bladder 13 to its compressed state is limited by contact of the upper edge of the stop sleeve 34 with the underside of the upper end plate 14. When this collapsing contact occurs, the cross pin 27 nests in semi-cylindrical recesses 40 in the bottom face of the upper mounting ring, but remains spaced slightly from the upper axial end of the slot 25. An assembly of the retrofit internal guide and stroke limiting arrangement is shown in FIG. 5 without the air bladder 13. To reduce friction and facilitate relative axial movement between the guide rod 23 and the guide sleeve 28, a suitable bearing sleeve 38 is preferably inserted axially into a counterbore 41 in the blind bore 26 of the guide sleeve. A manganese bronze/graphite bushing is one suitable type of bearing sleeve 38.

Figure 8:
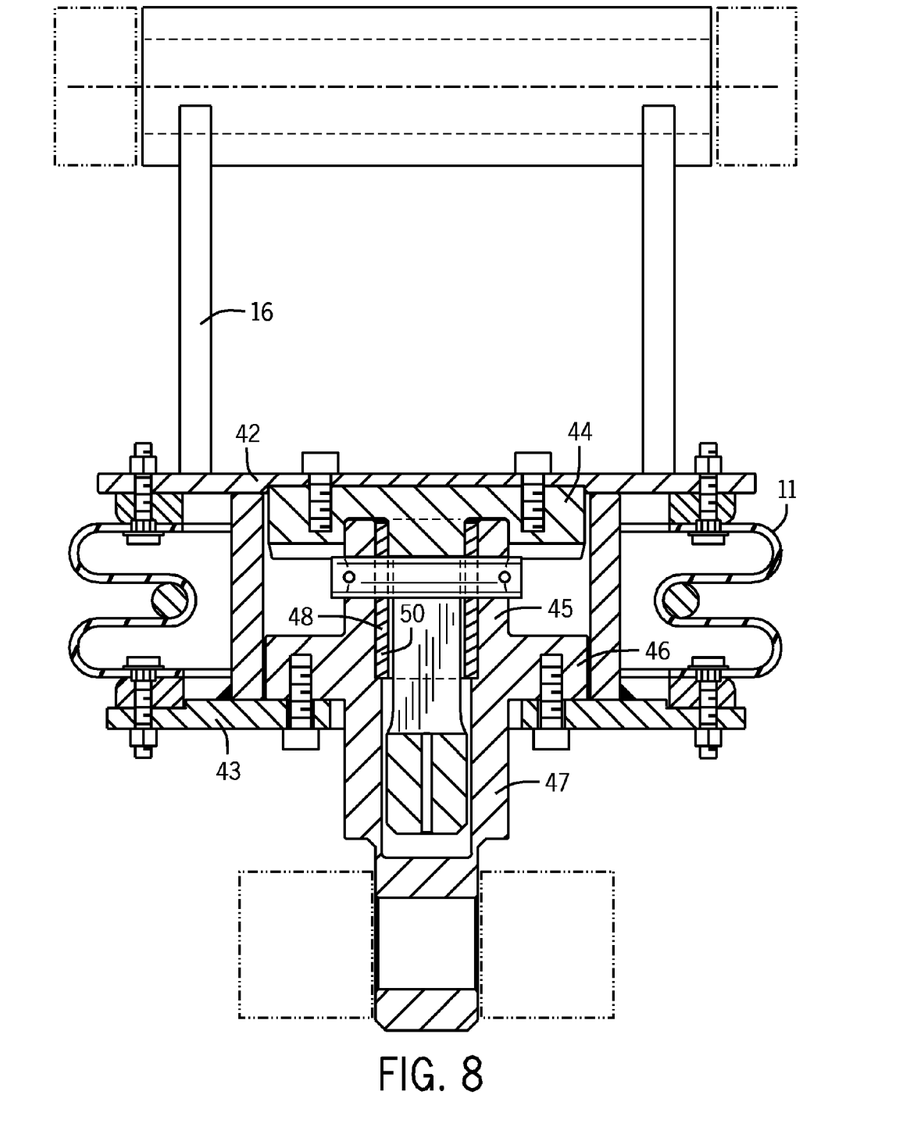
FIG. 8 is a sectional view similar to FIG. 6 showing an air bladder actuator of the present invention newly manufactured without retrofit parts.

In FIG. 8, there is shown an air bladder actuator of the present invention which is newly manufactured, rather than utilizing parts of an air cylinder actuator of the type shown in FIG. 1. In the FIG. 8 construction, the upper and lower end plates 42 and 43 are of new construction. The upper mounting ring 44 and the guide rod 45 are of a unitary construction, machined from a casting or other steel piece. Similarly, the lower mounting ring 46 and guide sleeve 47 are also of unitary construction, machined from steel stock or a casting as well. The upper end plate 42 is bolted directly to the upper mounting ring, as in the previous embodiment. Similarly, the lower end plate 43 is bolted to the lower mounting ring 46 that carries the integral guide sleeve 47. As in the previously described embodiment, the guide sleeve 47 carries a bearing sleeve 48 in a counterbore 50.

Otherwise, the air bladder actuator of new construction, shown in FIG. 8, operates identically to the previously described retrofit embodiment.

What is claimed is:

1. A guide and stroke limiting arrangement for an air bladder actuator, adapted to be mounted between the upper and lower end plates of and inside the air bladder which is attached at opposite ends to the peripheral edges of the end plates, the arrangement comprising:
   a guide rod attached to and extending downwardly from the upper end plate on the axis thereof;
   a tubular guide sleeve attached to and extending upwardly from the lower end plate coaxially therewith and adapted to slidably receive the guide rod;
   one of the guide rod and the guide sleeve carrying a diametrical cross pin attached to a free end and extending perpendicular to the axis;
   the other of the guide rod and the guide sleeve having an axially elongated through slot through which said cross pin extends and slides vertically with respect thereto in response to inflation and deflation of the air bladder;
   the slot having an end stop position adapted to be engaged by the pin in response to inflation to provide a maximum stroke length stop; and,
   a tubular stop sleeve attached to one of the end plates coaxially with and surrounding the guide rod and the guide sleeve, the stop sleeve having a free edge positioned to engage the other of the end plates to provide a minimum stroke length stop.

2. The arrangement as set forth in claim 1 wherein the guide sleeve carries the cross pin and the guide rod has the slot.

3. The arrangement as set forth in claim 2 wherein the guide sleeve comprises a rod member and is attached to and extends through the lower end plate.

4. The arrangement as set forth in claim 3 wherein the guide sleeve comprises a blind bore in the rod member.

5. The arrangement as set forth in claim 4, wherein the blind bore in the guide sleeve is provided with a cylindrical counterbore adapted to receive a cylindrical bearing sleeve therein.

6. The arrangement as set forth in claim 5 wherein the bearing sleeve is held in the counterbore with a tight press fit.

7. The arrangement as set forth in claim 4 wherein the guide sleeve rod member is attached to a lower mounting ring and the mounting ring is bolted to the lower end plate.

8. The arrangement as set forth in claim 3 wherein the lower end of the guide sleeve rod member extends beyond the lower end plate and terminates in a pivotal mounting arrangement for one end of the air bladder actuator.

9. The arrangement as set forth in claim 2 wherein the stop sleeve is mounted on the lower end plate.

10. The arrangement as set forth in claim 9 wherein the axial length of the stop sleeve is selected to provide engagement of the stop sleeve upper edge with the upper end plate before the cross pin engages the other end position of the slot.

11. The arrangement as set forth in claim 1 wherein the guide rod is attached to an upper mounting ring and the upper mounting ring is bolted to the upper end plate.

12. The arrangement as set forth in claim 11 wherein the upper mounting ring is provided with a diametrical semi-cylindrical recess to receive with clearance the cross pin when the air bladder is in its collapsed depressurized position.

13. The arrangement as set forth in claim 1 wherein the air bladder has upper and lower peripheral mounting flanges aligned respectively with the bolt hole patterns in the upper and lower end plates and are attached thereto with bolted connections.

14. A method for retrofitting an air cylinder operator in a railroad car retarder with an air bladder operator, wherein the air cylinder includes a cylinder body attached to and enclosed by an upper end plate and a lower end plate, a piston head mounted for reciprocal movement within the cylinder body on the upper end of a piston rod slidably extending through the lower end plate and attached at its lower end outside the cylinder body to a cylinder operating lever, the method comprising the steps of:
   (1) removing the cylinder body from its attachment to the upper and lower end plates;
   (2) removing the piston head from the piston rod;
   (3) attaching a guide rod to the underside of the upper end plate to extend perpendicularly downward on the axis of the plate;
   (4) attaching the lower end plate to the piston rod at a fixed position;
   (5) forming a guide sleeve in the upper end of the piston rod with an axial bore sized to slidably receive the guide rod therein;
   (6) providing either the guide rod or the guide sleeve with a diametrically extending cross pin;
   (7) positioning the cross pin in an axially extending through slot in the other of the guide rod or guide sleeve and within which the cross pin slides vertically in response to inflation and deflation of the air bladder;
   (8) providing the slot with an end position engaged by the pin to provide a maximum stroke length stop in response to bladder inflation; and,
   (9) attaching a stop sleeve to one of the end plates and providing the other end of the stop sleeve with a free edge positioned to engage the other end plate to provide a minimum stroke length stop.

15. The method as set forth in claim 14, wherein the step of attaching the guide rod to the underside of the upper end plate comprises:

(1) securing the upper end of the guide rod to an upper mounting ring; and
(2) bolting the upper end plate to the upper side of the upper mounting ring.

16. The method as set forth in claim 14, wherein the step of attaching the lower end plate to the piston rod comprises:

(1) welding a lower mounting ring to the piston rod at an intermediate position along its length; and
(2) bolting the lower end plate to the underside of the lower mounting ring.

* * * * *